Jan. 26, 1971  N. L. WALTERS  3,559,200
MONITORING UNIT FOR SIGNALLING A SPECIFIC CONDITION IN
THE CIRCUITRY SUPPLYING POWER TO AN ELECTRICAL DEVICE
Filed Feb. 8, 1968
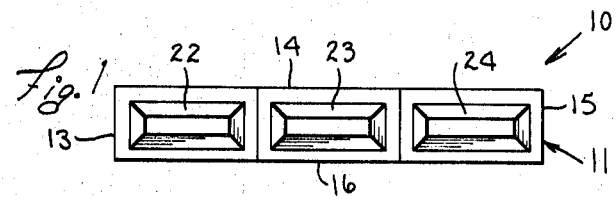
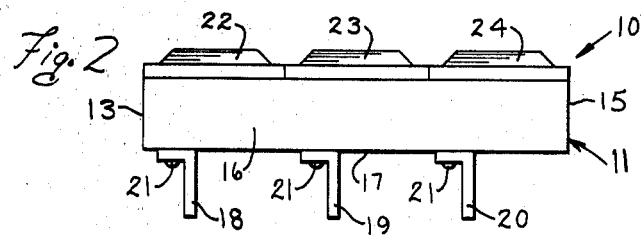
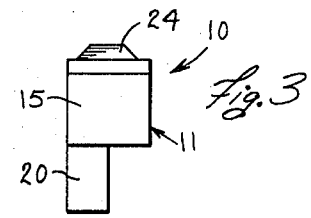
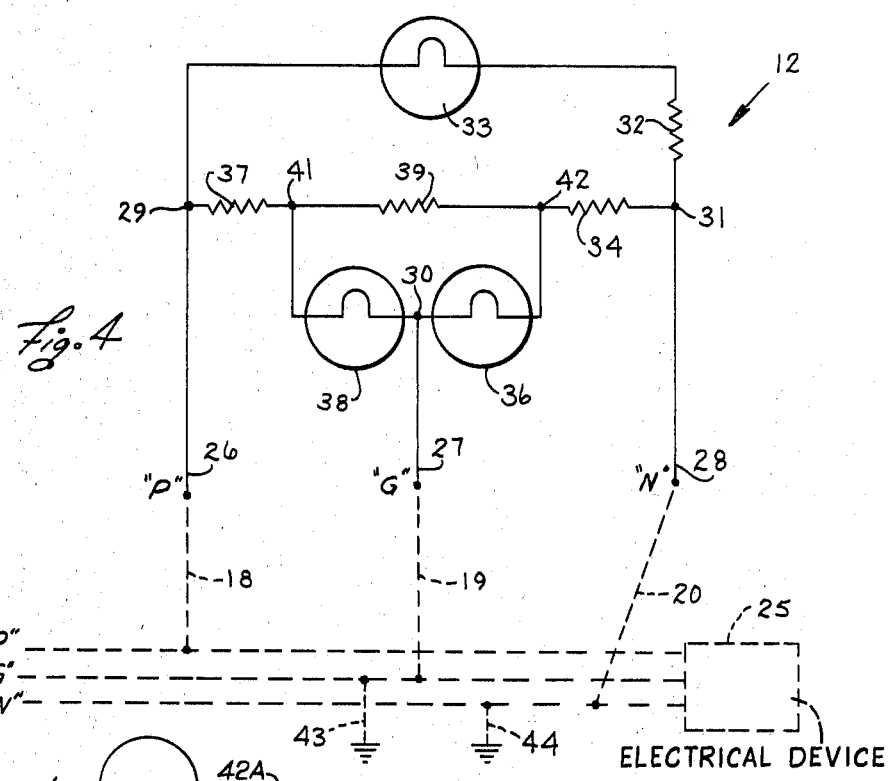
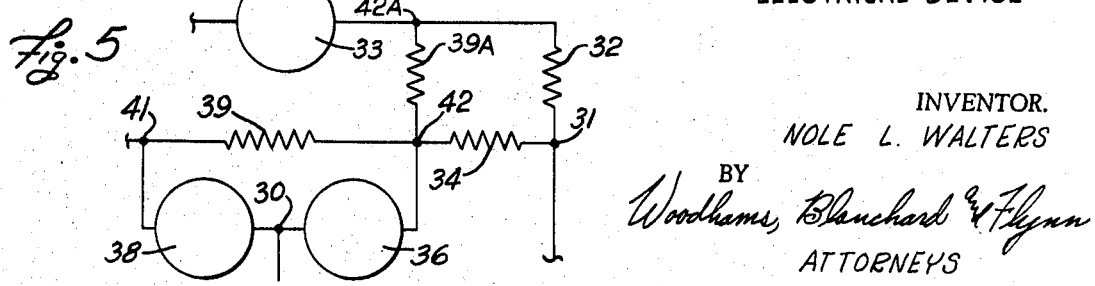
INVENTOR.
NOLE L. WALTERS
BY
Woodhams, Blanchard & Flynn
ATTORNEYS

United States Patent Office 3,559,200
Patented Jan. 26, 1971

3,559,200
MONITORING UNIT FOR SIGNALLING A SPECIFIC CONDITION IN THE CIRCUITRY SUPPLYING POWER TO AN ELECTRICAL DEVICE
Nole L. Walters, Mishawaka, Ind., assignor, by mesne assignments, to Trinetics, Inc., Mishawaka, Ind., a corporation of Indiana
Filed Feb. 8, 1968, Ser. No. 704,176
Int. Cl. G08b 21/00
U.S. Cl. 340—255    6 Claims

ABSTRACT OF THE DISCLOSURE

A monitoring unit for signalling a specific condition in the power supply circuitry for an electrical device. The unit has three terminals. A first signalling device is connected between the first and third terminals. A second signalling device is connected between the second and third terminals. A third signalling device is connected between the first and second terminals. A biasing circuit is connected between the first and third terminals so that the monitoring unit will issue a signal indicating only a specific condition in the power supply circuitry. The monitoring unit is housed in a housing.

FIELD OF THE INVENTION

This invention relates to a monitoring unit and, more particularly, relates to monitoring circuitry for signalling a specific condition in the power supply circuitry.

BACKGROUND OF THE INVENTION

Electrical circuitry for issuing signals of one kind or another to indicate the functioning or malfunctioning of electrical circuitry has been known for many years. Such signal devices have been provided which indicate whether an electrical device is turned on, is under emergency stop conditions, is producing the desired output, and many other meaningful signals depending upon the type of apparatus in which they are installed. However, very little in the field has been done to provide a monitoring unit for issuing a signal when a malfunctioning occurs in the electrical lines or wiring, as house wiring, supplying power to an electrical device. It is recognized, of course, that if some malfunction occurs in the electrical wiring supplying the input power to the electrical device, said electrical device will manifest a rather noticeable change in the output such as a cease in function. Or as a further example, if the ground return path acquires an infinite impedance, the electrical device such as an electrical toaster, may continue to operate without manifesting any change in the output. However, a dangerous condition exists in that the electrical device is no longer grounded. Therefore, persons using the electrical device are subject to severe shocks if, for example, they should touch at the same time grounded objects such as water pipes, gas pipes, heating ducts, concrete floors and bare earth.

Operating rooms of hospitals are considered dangerous during the performance of operations due to the fact that pure oxygen is used when the patient is anesthetized which creates an inflammatory environment. In some instances, where ether is used, the combination of ether and oxygen also creates an inflammatory environment within the room. Thus, it becomes extremely important to prevent the development of sparks by the generation of static electricity in the clothing of the surgical personnel as well as preventing the electrical equipment from becoming ungrounded.

Pat. No. 3,168,682, issued Feb. 2, 1965, discloses one type of apparatus which can be used in operating rooms to signal the failure of a ground connection in an electrical device, and said signal indicated generally by the electrical device being rendered inoperative. The electrical device cannot be restored to an operative condition without repairing the faulty ground connection. However, in order to determine whether the electrical device is effectively grounded prior to the operating procedure, it is necessary for the surgery personnel to at least try the electrical device. If it does not work, the apparatus described in the aforementioned patent has been triggered to disconnect the input power therefrom. However, the apparatus described in the aforementioned patent only provides a signal which indicates a faulty ground connection. Apparatus which can detect other malfunctions in electrical circuitry will be advantageous.

Accordingly, the objects of this invention are:
(1) To provide a monitoring unit for signalling a particular malfunctioning in electrical circuitry.
(2) To provide a monitoring unit, as aforesaid, which will issue a signal indicating a poor ground connection.
(3) To provide a monitoring unit, as aforesaid, which will issue a signal indicating a poor neutral connection.
(4) To provide a monitoring unit, as aforesaid, which will issue a signal indicating that the circuit is safe to use.
(5) To provide a monitoring unit, as aforesaid, which will issue a signal indicating a reversed polarity in the circuit.

Other objects and purposes of this invention will be apparent to persons acquainted with apparatus of this general type upon reading the following specification and inspecting the accompanying drawing.

BRIEF DESCRIPTION OF THE DRAWING

FIG. 1 is a top view of an enclosure for housing the electrical circuitry embodying the invention.
FIG. 2 is a side view of the enclosure.
FIG. 3 is an end view of the enclosure.
FIG. 4 is an electrical schematic of the circuit embodying the invention.
FIG. 5 is a fragmentary electrical schematic of a modified circuit.

Certain reference characters will be used in the following description for convenience. The letter "P" will have reference to the "positive" or "hot" connection in the electrical circuitry. The letter "N" will have reference to the "neutral" connection in the electrical circuitry. The letter "G" will have reference to the "ground" connection in the electrical circuitry.

SUMMARY OF THE INVENTION

In general, the objects and purposes of the invention are met by providing a monitoring unit having means defining first, second and third input terminal means, a first signalling means connected between the first and third terminal means, a second signalling means connected between the second and third terminal means, a third signalling means connected between the first and second terminal means and biasing means connected in parallel with said second and third signalling means so that said monitoring unit will issue a signal indicating a specific malfunctioning in other electrical circuitry.

DETAILED DESCRIPTION

A monitoring unit 10 comprises a rectangular enclosure 11 (FIGS. 1–3) which houses the electrical circuitry 12 illustrated in FIG. 4. More particularly, the enclosure 11 has four sidewalls 13, 14, 15 and 16 and a bottom wall 17. The bottom wall has three terminals 18, 19 and 20 secured thereto by any convenient means such as rivets 21. Three lenses 22, 23 and 24 cover the top of the enclosure 11.

Referring to the circuitry illustrated in FIG. 4, conductors 26, 27 and 28 are connected at one end to the terminals 18, 19 and 20, respectively, on the enclosure 11 and ending, at the other end, in junction points 29, 30 and 31. The terminals 18, 19 and 20 are preferably connected to the power lines supplying power to an electrical device 25. A series connected resistor 32 and signal device such as a light 33 are connected between the junction points 29 and 31. A series connected resistor 34 and signal device such as a light 36 are connected between the junction points 30 and 31. A series connected resistor 37 and light 38 are connected between the junction points 29 and 30. A resistor 39 is connected in parallel with the lights 36 and 38 between the junction points 41 and 42. Said lights 33, 36 and 38 may be of any desired type, such as incandescent, glow lamps, neon lights or they may be replaced by other kinds of signalling devices sensitive to current flow as desired.

The lights 33, 36 and 38 are covered in the enclosure 11 by the lenses 22, 23 and 24, respectively. Furthermore, the resistors 32, 34 and 37 are, in this embodiment, equal. FIG. 4 also illustrates that the lines "G" and "N" are connected to grounds 43 and 44, respectively.

OPERATION

The operation of the device embodying the invention will be described in detail hereinbelow for a better understanding of the invention.

For reference purposes, the letters "P" and "N" have been assigned to the conductors 26 and 28, respectively, to indicate the positive and neutral terminals in the circuit 12. The letter "G" has been assigned to the conductor 27 to indicate the ground terminal in the circuit 12.

First, it is assumed that the monitoring unit 10 and enclosure 11 are connected to a grounded electrical outlet and/or other electrical circuitry 25. Furthermore, the circuitry 12 is capable of rendering five separate and distinct signals to indicate five separate and distinct conditions in the circuitry 25 which is being monitored. The five conditions are discussed separately below under the headings Conditions 1, 2, 3, 4 and 5.

CONDITION 1

The polarity is correct when lights 33 and 38 will ignite and glow brightly. That is, the current will come from "P" and split at the terminal 29 so that part of the current will pass through the light 33 and resistor 32 to terminal 31 and part will pass through resistor 37 and light 38 to terminal 30. In the case where a potential difference of 110 volts exists between "P" and "N," there remains a potential difference of about 20 volts between junction points 30 and 42. However, this potential difference is insufficient to ignite the light 36.

CONDITION 2

If, however, the polarity is reversed, that is, "P" and "N" have been reversed in the electrical circuitry being tested, the current now comes into terminal 31 and splits so that part of the current will pass through the light 36 and resistor 34 to terminal 30 and the other part of the current will pass through the ristor 32 and light 33 to the terminal 29 thereby igniting the lights 36 and 33 and causing them to glow brightly. The potential difference of about 20 volts between junction points 30 and 41 is insufficient to ignite the light 38.

CONDITION 3

If, for example, there exists a high resistance to ground 44 at the neutral "N" terminal, only light 38 will ignite. However, it is to be recognized that the resistance to ground 44 at this terminal sometimes assumes a value which is other than zero or infinity. In such cases, the power from P will split at the terminal 29 and pass through the light 33 and resistor 32 to the terminal 31 as well as through the resistor 37 and light 38 to the junction point 30 causing both lights to ignite. Light 38 will glow brightly due to the good connection of "G" to ground. However, the intensity of light 33 is dependent upon the resistance to ground at "N" and as the resistance to ground 44 at "N" gets higher, light 33 will glow dimmer. It will not ignite when the resistance is about one meghom.

CONDITION 4

If, for example, a high resistance to ground 43 exists at the ground "G" terminal, only light 33 will ignite. However, it is to be recognized that the resistance to ground 43 at this terminal sometimes assumes a value which is other than zero or infinity. In such cases, the power from P will split at the terminal 29 and pass through the light 33 and resistor 32 to the terminal 31 as well as through the resistor 37 and light 38 to the junction point 30 causing both lights to ignite. Light 33 will glow brightly. However, the intensity of light 38 is dependent upon the resistance to ground at "G," and as the resistance to ground 43 at "G" gets higher, light 38 will glow dimmer. It will not ignite when the resistance to ground 43 is about 100K ohms.

The resistor 39 provides a sufficient shunt to give a specific cutoff value resistance for light 38 and prevents light 36 from glowing in Condition 4 and gives a specific cutoff value resistance for light 33 and prevents light 36 from glowing in Condition 3. If resistor 39 were not used, all three lights would light under conditions of poor ground or neutral connections in Conditions 3 and 4. In most applications, only "N" or "G" is monitored, not both. Either "N" or "G" can be attached to point 27 and the other to point 28. The ground connection attached to terminal 27 will have the lower resistance "cut off" point (100K in this example). In the event it is desirable to monitor both "N" and "G" and have the resistance at which the lights will go out approximately equal, resistor 39A (FIG. 5) can be added between junction point 42 and junction point 42A located on the conductor between resistor 32 and light 33 to provide this feature. Resistor 39A shunts light 33 in the same manner as ristor 39 does for lights 36 and 38. The resistance value at which the lights will go out can be varied by varying the resistance values of all the resistors and/or using different types of lights having a higher or lower ignition voltage value.

CONDITION 5

When no lights are ignited, there is no power input and the other circuitry is inoperative.

The embodiments of the invention in which an exclusive property or privilege is claimed are defined as follows:

1. A monitoring unit for signaling specific conditions in the circuitry supplying power to an electrical load device, comprising:

means defining first, second and third terminal means and means for connecting same to said power supply circuitry;

a first signaling means connected between said first and third terminal means;

a second signaling means connected between said second and third terminal means;

a third signaling means connected between said first and second terminal means;

voltage dropping means connected between said first terminal means and said third signaling means;

biasing means connected across said second and third signaling means and to a point between said voltage dropping means and said third signaling means for preventing spurious ignition of said third signaling means in response to particular conditions of said second terminal means while allowing ignition of said third signaling means for other conditions of said second terminal means.

2. The monitoring unit defined in claim 1, wherein said biasing means comprises a resistor.

3. The monitoring unit defined in claim 1, including means for housing said monitoring circuitry and means for releasably connecting said monitoring circuitry to said electrical device.

4. A monitoring unit for signaling a specific condition in the circuitry supplying power to an electrical device, comprising:

means defining first, second and third terminals;
a series connected first lamp and first resistor connected between said first and third terminals;
a series connected second lamp and second resistor connected between said second and third terminals, said second lamp and second resistor having a first junction point therebetween;
a series connected third lamp and third resistor connected between said first and second terminals, said third lamp and said third resistor having a second junction point therebetween;
a resistor connected between said first and second junction points; whereby when a specific condition exists in said circuitry supplying power to an electrical device, said monitoring unit will issue a signal by ignition of certain ones of the lamps to visually indicate said specific condition in said power supply circuitry.

5. A monitoring unit defined in claim 4 including a resistor connected between said first junction point and a third junction point between said first lamp and said first resistor.

6. A monitoring unit defined in claim 4 including a housing having three male prongs projecting outwardly from one wall thereof and three transparent lens on another wall, said housing encasing said circuitry and having each of said lamps positioned adjacent one of said lens.

References Cited

UNITED STATES PATENTS

| | | | |
|---|---|---|---|
| 2,382,647 | 8/1945 | McLoughlin et al. | 340—255X |
| 3,205,436 | 9/1965 | Donahue | 324—51 |
| 3,317,825 | 5/1967 | Huff | 324—51 |
| 3,383,588 | 5/1968 | Stoll et al. | 324—51 |

DONALD J. YUSKO, Primary Examiner

D. MYER, Assistant Examiner

U.S. Cl. X.R.

324—51